United States Patent

[11] 3,623,679

[72] Inventors Karl Neudecker
Munich;
Johann Zanner, Unterhaching, near Munich; Alois Schwitz, Unterhaching, near Munich; Rudolf Blank, Cologne Dunnwald; Ehgartner Gabriele, Pullach, near Munich, all of Germany
[21] Appl. No. 878,373
[22] Filed Nov. 20, 1969
[45] Patented Nov. 30, 1971
[73] Assignee AGFA Gevaert Aktiengesellschaft Leverkusen, Germany
[32] Priorities Sept. 13, 1969
[33] Germany
[31] P 19 46 514.6;
Apr. 25, 1969, Germany, No. P 19 21 278.3

[54] PHOTOGRAPHIC APPARATUS AND FILM MAGAZINE THEREFOR
22 Claims, 4 Drawing Figs.
[52] U.S. Cl. .................................................. 242/194, 242/71.2, 352/156
[51] Int. Cl. .................................................. G03b 1/04, G11b 15/32
[50] Field of Search.......................................... 242/194, 193, 71.2; 352/72–78, 156

[56] References Cited
UNITED STATES PATENTS
3,208,686 9/1965 Edwards et al. ............... 242/71.2
3,415,599 12/1968 Winkler et al. ............... 352/78
FOREIGN PATENTS
6,916,866 11/1969 Germany..................... 242/197
OTHER REFERENCES
German Gebruchsmuster filed 4/25/69. 2 Copies provided for ROS, are enclosed herewith.

Primary Examiner—Leonard D. Christian
Attorney—Michael S. Striker

ABSTRACT: A magazine for motion-picture film which comprises a casing having first and second chambers for convoluted exposed and unexposed film, a core member rotatable in the first chamber and coaxial with unexposed film in the second chamber to respectively collect and pay out exposed film during rotation in first and second directions, and a blocking device including a sleeve movable axially of but rotatable with the core member and a disk mounted in the casing. A spring biases the sleeve into engagement with the disk to hold the core member against rotation in the second direction. A rotary output member of a drive in the camera moves the sleeve axially and away from engagement with the disk when the magazine is properly attached to the camera whereby the core member can be rotated in either direction as long as the magazine remains attached to the camera.

INVENTORS

KARL NEUDECKER
JOHANN ZANNER jun.
ALOIS SCHWITZ
RUDOLF BLANK
GABRIELE EHGARTNER

BY 3,623,679

PHOTOGRAPHIC APPARATUS AND FILM MAGAZINE THEREFOR

CROSS-REFERENCE TO RELATED INVENTION

The magazine of the present invention constitutes an improvement over and a further development of the magazine which is disclosed in U.S. Pat. No. 3,455,519 granted July 15, 1969, to Gersch and assigned to the same assignee.

BACKGROUND OF THE INVENTION

The present invention relates to motion-picture cameras which utilize magazines or cassettes of the type wherein the supply of convoluted unexposed film is coaxial with convoluted exposed film. More particularly, the invention relates to improvements in motion-picture cameras which can utilize such types of magazines and are provided with means for producing fade-in and fadeout effects, as well as to improvements in magazines for use in such cameras.

A magazine or cassette wherein the unexposed part of motion-picture film is stored coaxially with exposed film is disclosed, for example, in the aforementioned patent to Gersch. The magazine accommodates an annular disk-shaped blocking element which prevents rotation of the core member for exposed film in one direction. This is desirable in order to prevent uncontrolled unwinding of exposed film. However, such magazines cannot be used in cameras which are designed to produce fadeout and fade-in effects, i.e., in cameras wherein that length of film which was exposed during fadeout must be transported rearwardly past the film gate so as to be exposed again during fade-in. The blocking element is operative at all times and thus prevents transport of exposed film in a direction counter to that in which the film is transported by the pulldown when the camera is operated in the normal way.

SUMMARY OF THE INVENTION

An object of the present invention is to provide a magazine or cassette wherein the exposed part of motion picture film is stored coaxially with the supply of unexposed film and which permits transport of exposed film in a rearward direction preparatory to producing a fade-in effect but invariably prevents uncontrolled unwinding of exposed film.

Another object of the invention is to provide a magazine wherein the film can be transported in one direction only or cannot be transported at all when the magazine is withdrawn from or otherwise detached or disconnected from a motion picture camera.

A further object of the invention is to provide a novel blocking structure which normally prevents unwinding of exposed motion picture film in magazines or cassettes of the type wherein exposed film is stored coaxially with a supply of unexposed film.

An additional object of the invention is to provide a magazine of the above outlined character wherein the configuration of the casing is identical with or closely resembles that of casings in conventional magazines so that the improved magazine can be used interchangeable with such conventional magazines.

Still another object of the invention is to provide a motion picture camera which can utilize the improved magazine, particularly a motion-picture camera for 8-millimeter film which can automatically deactivate the blocking structure when the magazine is properly inserted or otherwise attached thereto.

An ancillary object of the invention is to provide a motion-picture camera which can be used with the improved magazine as well as with conventional magazines of the type wherein the exposed film is stored coaxially with unexposed film and which requires minimal alterations to be placed in condition for acceptance of both types of such magazines.

One feature of the present invention resides in the provision of a magazine for motion-picture film wherein a supply of convoluted unexposed film is stored coaxially with convoluted exposed film. The magazine comprises a casing which defines first and second chambers respectively arranged to accommodate exposed and unexposed film, a core member rotatably accommodated in the first chamber to collect exposed film while rotating in a first direction and to pay out exposed film while rotating in a second direction, and blocking means comprising a first blocking element which is mounted in the casing and second blocking element which is rotatable with the core member. One of these blocking elements is movable substantially axially of the core member between a first position in which the blocking elements cooperate to hold the core member against rotation in the second direction and a second position in which the core member is free to rotate in the second direction, for example, during rewinding of film prior to fade-in.

The magazine further preferably includes biasing means for yieldably urging the one blocking element to its first position so that the core member is normally held against rotation in a direction to pay out exposed film, at least when the magazine is detached from a motion-picture camera. The latter is provided with rotary actuating means, for example a pin or an analogous output member which forms part of drive means for the core member and automatically moves the one blocking element to second position when the magazine is properly inserted into or otherwise attached to the camera. The output member can be rotated by the drive means in a direction to rotate the core member in the first direction, and a friction clutch or like rotation-impeding means is preferably provided in the camera to yieldably hold the output member and hence the core member against rotation in the second direction when the exposed film is being transported rearwardly (i.e., while the core member pays out exposed film) during backward transport of film subsequent to fadeout but prior to fade-in.

The novel features which are considered as characteristic of the invention are set forth in particular in the appended claims. The improved motion-picture camera and the magazine, however, both as to their construction and the mode of operation of the camera, together with additional features and advantages thereof, will be best understood upon perusal of the following detailed description of certain specific embodiments with reference to the accompanying drawing.

DESCRIPTION OF THE PREFERRED EMBODIMENTS

Figure 1:
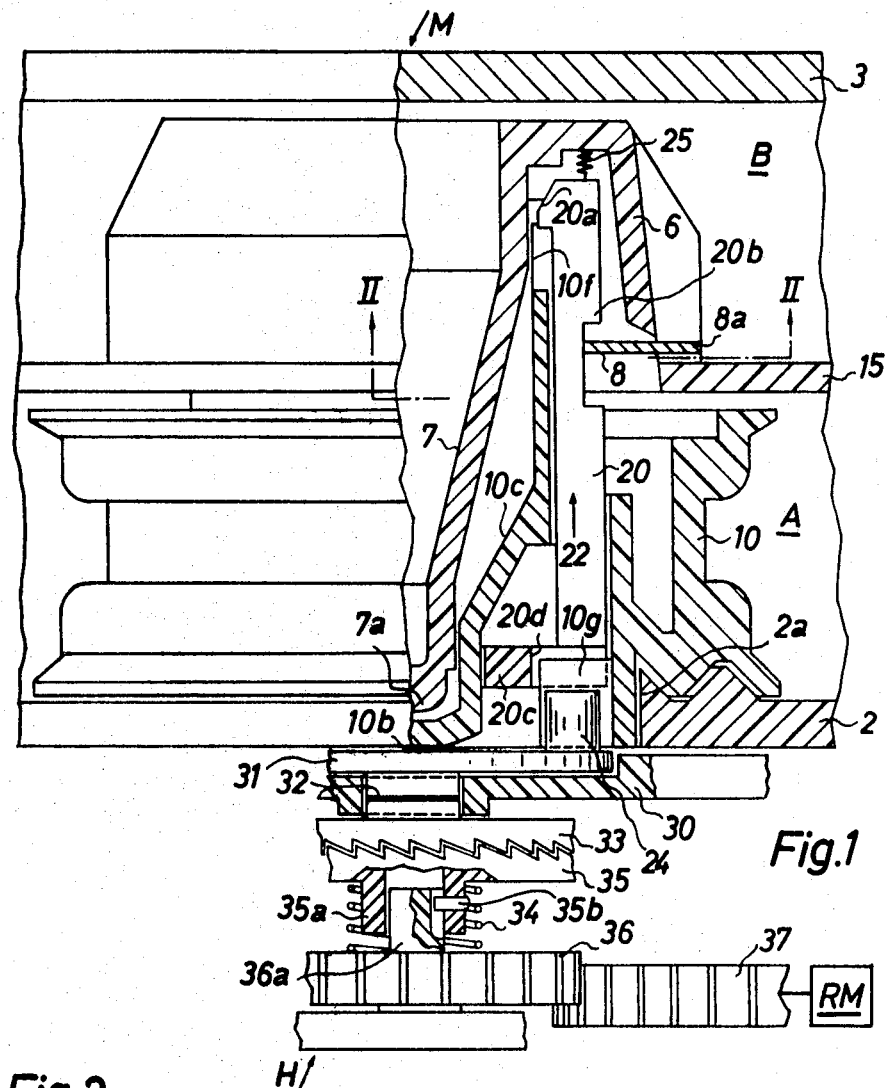
FIG. 1 is a fragmentary axial sectional view of a magazine which embodies one form of the invention, further showing a portion of a motion-picture camera which can utilize such magazine.

FIG. 1 shows a portion of a novel motion-picture camera containing or supporting a magazine or cassette M which embodies one form of the present invention. The magazine M comprises a casing 1 (FIG. 2) including a pair of covers or lids 2, 3. The cover 2 is provided with a central opening 2a and the casing 1 further includes a partition or panel 15 located substantially midway between the covers 2,3 and dividing the interior of the casing into chambers A, B. The chamber B between the cover 3 and partition 15 accommodates an annular core member 6 for unexposed motion-picture film (not shown). The core member 6 has a conical centerpiece 7 which extends through a central opening of the partition 15 and into the chamber A, and this centerpiece 7 is provided with a substantially semispherical bearing 7a. The core member 6 is rigid or integral with the cover 3 or partition 15 and has two radial slots 6a located diametrically opposite each other and receiving with freedom of radial movement two radial projections or lugs 8a provided on a disk-shaped blocking element 8. The parts 8, 1, 2, 3, 6, 15 preferably consist of synthetic plastic material.

The internal surface of the blocking element 8 is provided with two projections here shown as ratchet teeth 8A each of which includes a substantially radial flank 8b and a concave blank 8c. The magazine M is loaded with unexposed film at the manufacturing plant. A supply of convoluted unexposed film is inserted into the chamber B and its leader is guided along the film gate (not shown) provided in a sidewall of the casing 1. Such leader is thereupon attached to a rotary second core member 10 which is installed in the chamber A and serves to collect or pay out exposed film. The core member 10 has a socket 10b which receives and is turnable on the bearing 7a of the centerpiece 7 on the stationary core member 6. When the magazine M is fully assembled, the socket 10b is centered in the central opening 2a of the cover 2. As shown in FIG. 1, the socket 10b forms part of a hollow conical centerpiece 10c of the core member 10; this centerpiece 10c surrounds a portion of the centerpiece 7 on the stationary core member 6.

In accordance with a feature of the invention, the rotary core member 10 is coupled with and carries an axially movable second blocking element here shown as a cylinder or sleeve 20 which can cooperate with the blocking element 8 to prevent rotation of the core member 10 in one direction (namely, in the direction in which the core member 10 must rotate to pay out exposed film) when the mechanism of the camera causes the sleeve 20 to assume a predetermined axial position. The lower end portion of the sleeve 20 (as viewed in FIG. 1) is accessible by way of the central opening 2a in the cover 2.

The rotary core member 10 and the sleeve 20 are axially movably coupled to each other by axially parallel projections or claws 10f, 20a which cause the sleeve to share rotary movements of the core member 10 but permit the sleeve to move axially so as to place its external projections or ribs 20b into and away from registry with the teeth 8A of the blocking element 8. The ribs 20b extend axially along a portion of the sleeve 20. FIG. 1 shows the sleeve 20 in that axial position in which its ribs 20b are away from registry with (at a level above) the teeth 8A of the blocking element 8 so that the core member 10 can be rotated in either direction. In the illustrated embodiment, the blocking element 8 has two teeth 8A and the sleeve 20 comprises three equidistant ribs 20b (see FIG. 2).

As explained above, the magazine M is assembled and loaded with film at the manufacturing plant. Once the leader of the supply of unexposed film in the chamber B is guided past the film gate and is attached to the core member 10, the latter is inserted into the chamber A so that its socket 10b accommodates and is turnable on the bearing 7a. The covers 2, 3 are then attached to the main portion of the casing 1 whereby the socket 10b of the core member 10 and one end portion of the sleeve 20 extend into the central opening 2a. The core member 10 is then connectable with the output member or actuating member 24 of the drive means in the camera in a manner to be described below. Such output member 24 can thereupon rotate the core member 10 in a clockwise direction, as viewed in FIG. 2, whereby the ribs 20b of the sleeve 20 shift the blocking element 8 radially of the fixed core member 6 whenever a rib 20b engages the concave flank 8c of the one or the other tooth 8A. Unwinding of convoluted exposed film on the core member 10 is prevented by the radial flanks 8b of teeth 8A as soon as the magazine M is detached from the camera. One such radial flank 8b engages and arrests an oncoming rib 20b of the sleeve 20 when the film in the chamber A tends to unwind and rotates the core member 10 and sleeve 20 in a counterclockwise direction, as viewed in FIG. 2. The sleeve 20 is capable of preventing counterclockwise rotation of the core member 10 when its ribs 20b register with the teeth 8A.

Figure 2:
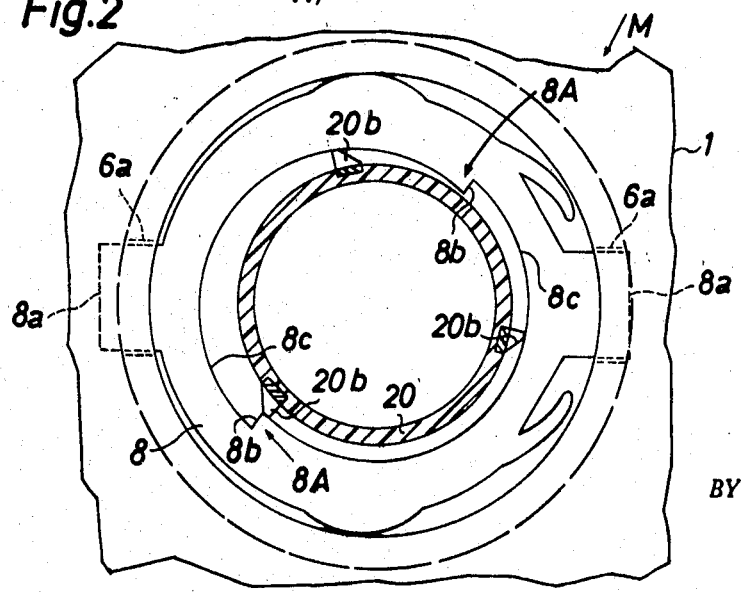
FIG. 2 is a fragmentary transverse sectional view of the magazine as seen in the direction of arrows from the line II—II of FIG. 1.

In presently known magazines of the type shown in FIGS. 1 and 2 (e.g., in the aforementioned U.S. Pat. No. 3,455,519 to Gersch), the ribs are provided directly on the rotary core member and are in permanent registry with the teeth of the blocking element so that the rotary core member is permanently restricted to rotary movement in a single direction, namely, in a direction to collect exposed film. Consequently, such conventional magazines cannot be utilized in motion-picture cameras which are designed to produce fadeout and fade-in effects. Due to the provision of the aforementioned sleeve 20, and also to the provision of a helical spring 25 (or analogous biasing means) which urges the sleeve to normal position in which its ribs 20b register with the teeth 8A of the blocking element 8, the magazines M of FIGS. 1 and 2 prevents unwinding of exposed film in the chamber A when the magazine is withdrawn or detached from the motion-picture camera, but the operator of the camera can unwind exposed film (so as to transport it back into the chamber B) when the magazine is inserted into the camera. Such unwinding of exposed film is necessary subsequent to completion of fadeout and prior to start of fade-in. The chamber B is large enough to accommodate a looped portion of exposed film which is transported backwards along the film gate of the casing 1 during rotation of the core member 10 in a counterclockwise direction, as viewed in FIG. 2. Since the mechanism which unwinds exposed film from the core member 10 is in positive engagement with this core member, unwinding of exposed film is fully controlled and the camera returns into the chamber B only that portion of the film which was exposed during fadeout. Thus, the ribs 20b of the sleeve 20 need not cooperate with the teeth 8A of the blocking element 8 during transport of exposed film into the chamber B because the rewinding mechanism then performs the function of the blocking element 8 by preventing excessive unwinding of exposed film from the core member 10. The motion-picture camera which utilizes the magazine M of FIGS. 1 and 2 preferably includes a pulldown whose claw can transport the film along the film gate in two directions, namely, from the chamber B into the chamber A (normal operation) and from the chamber A into the chamber B at the time when the core member 10 is driven in a counterclockwise direction and the ribs 20b of the sleeve 20 are away from registry with the teeth 8A of the blocking element 8.

The lower end portion of the sleeve 20 (as viewed in FIG. 1) is provided with an annular extension or flange 20c which fills the central opening 2a of the cover 2 around the socket 10b when the spring 25 is free to expand so as to maintain the ribs 20b in registry with the teeth 8A of the blocking element 8. The flange 20c is formed with recesses or slots 20d which normally accommodate torque-receiving portions 10g on the core member 10. The portions 10g are rigid or integral with the core member 10 and extend to the plane of the outer side of the cover 2. When the magazine M is inserted into or otherwise attached to the camera, the output member 24 displaces the flange 20c against the opposition of the spring 25 (arrow 22) so that the output member 24 is then free to rotate the core member 10 through the intermediary of the adjoining torque-receiving portion 10g. When the magazine M is detached from the camera, the spring 25 expands and the portions 10g are received in the recesses 20d of the flange 20c: the ribs 20b of the sleeve 20 then cooperate with the teeth 8A of the blocking element 8 to prevent unwinding of exposed film in the chamber A. An important advantage of the just-described magazine is that it can be used in cameras whose output members 24 are rather short.

The camera shown in the lower part of FIG. 1 comprises a housing or body H which accommodates the aforementioned drive means including the output member 24. The housing H includes a wall 30 which is provided with the cutout for a rotary wheel 31. The output member 24 constitutes an eccentric post of the wheel 31 and the latter can be rotated through the intermediary or against the opposition of a friction clutch 32. The driving element of the clutch 32 is rigid with the driven disk 33 of a torque-transmitting one-way clutch. The disk 33 can be driven by a driving disk 35 to rotate the wheel 31 in a clockwise direction. The adjoining faces of disks 33, 35 are provided with ratchet teeth and the disk 35 is biased axially against the disk 33 by a helical clutch spring 34. The hub 35a of the disk 35 is movable axially of the shaft 36a of a gear 36 which is driven by a gear 37 and can drive the disk 35 by way of a key 35b. The gear 37 receives torque from a suitable prime mover, e.g., a reversible electric motor RM.

The Operation:

When the motion-picture camera is operated in the normal way, the motor RM drives the gear 37 in a counterclockwise direction so that the gear 36 rotates in a clockwise direction and drives the rotary core member 10 in a clockwise direction through the intermediary of disks 35, 33, friction clutch 32, wheel 31, output member 24, sleeve 20 and claws 10f, 20a. The core member 10 is rotated in such direction during normal exposure of successive film frames (which are moved stepwise past the film gate in the casing 1 of the magazine M) and also when the camera is set to produce a fadeout effect. Upon completion of fadeout, the user of the camera might wish to produce a fade-in effect, i.e., to superimpose the pictures of the start of a fresh scene over the pictures of the end of the preceding scene. This necessitates transport of a certain length of exposed film back into the chamber B. The user reverses the direction of operation of motor RM so that the latter rotates the gear 37 in a clockwise direction whereby the gear 36 rotates the disk 35 in a counterclockwise direction. The teeth of the disk 35 then merely ride over the teeth of the disk 33 and the spring 34 expands and contracts. The output member 24 does not drive the sleeve 20 but the claw of the pulldown (whose operation is reversed in response to reversing the motor RM) moves the exposed film from the chamber A into the chamber B. The film which unwinds from the core member 10 rotates the latter in a counterclockwise direction whereby the friction clutch 32 prevents uncontrolled unwinding of exposed film. Thus, the friction clutch 32 tends to prevent or to impede rotation of the core member 10 in a counterclockwise direction but its force is insufficient to prevent unwinding of exposed film while the claw of the pulldown is operated in reverse. Once the claw has completed return movement into the chamber B of that portion of film which was exposed during the preceding fadeout, the direction of rotation of the motor RM is changed again so that it positively drives the core member 10 in a clockwise direction whereby the previously exposed frames of the film are exposed again to produce the fade-in effect. It will be seen that the clutch 32 takes over the function of the blocking element 8 when the magazine M is inserted into or otherwise attached to the housing H of the motion-picture camera. However, as soon as the magazine M is detached from the housing H, the spring 25 expands and places the ribs 20b into registry with the teeth 8A so that the blocking elements 20 and 8 can prevent uncontrolled unwinding of exposed film in the chamber A.

FIG. 23 illustrates a portion of a slightly modified motion picture camera which can also be used with magazines or cassettes M of the type shown in FIGS. 1 and 2. The difference is that the gear 136 of the drive means for the rotary core member 10 drives the driving element of the friction clutch 32 through the intermediary of a modified one-way torque-transmitting clutch. This one-way clutch comprises a disk 40 having recesses 40a in that end surface thereof which faces away from the friction clutch 32. The recesses 40a can receive projections or claws 41a of a second disk 41 which is movable in axial direction of the shaft 43 of the gear 136. The disk 41 is provided with a hollow cylindrical extension or hub 42 having an inclined slot 42a for a pin 44 provided on the shaft 43. When the reversible motor (not shown in FIG. 3) drives the gear 37 in a counterclockwise direction, the gear 136 is rotated in a clockwise direction and the pin 44 moves into the right-hand end of the slot 42a. This causes the extension 42 to move axially (Arrow 45) and to introduce the claws 41a of the disk 41 into recesses 40a of the disk 40. From then on, the disk 40 drives the wheel 31 through the intermediary of the friction clutch 32 so that the output member 24 rotates the sleeve 20 and the core member 10 in a direction to collect exposed film on the latter.

If the user of the camera wishes to transport a certain length of exposed film from the chamber A into the chamber B, the motor which drives the gear 37 is reversed so that the gear 37 rotates the gear 136 in a counterclockwise direction. The pin 44 moves into the left-hand end of the slot 42a and the extension 42 causes the disk 41 to withdraw its claws 41a from the recesses 40a of the disk 40. The driving connection between the motor and the output member 24 is then terminated but the motor drives the claw of the pulldown in a direction to transport the film from the chamber A into the chamber B. The core member 10 is rotated in a clockwise direction by exposed film (under the action of the claw of the pulldown) whereby the friction clutch 32 permits the wheel 31 to rotate with reference to the disk 40. Of course, the disk 40 can rotate with the wheel 31. When the chamber B accommodates that portion of the film which was exposed during fadeout, the direction of the motor is reversed again whereby the core member 10 rotates in a clockwise direction and collects the film, namely, that portion of exposed film which was exposed again during fade-in and thereupon successive frames of film which was not exposed during fadeout but is being exposed in response to continued operation of the motor in a forward direction.

Figure 3:
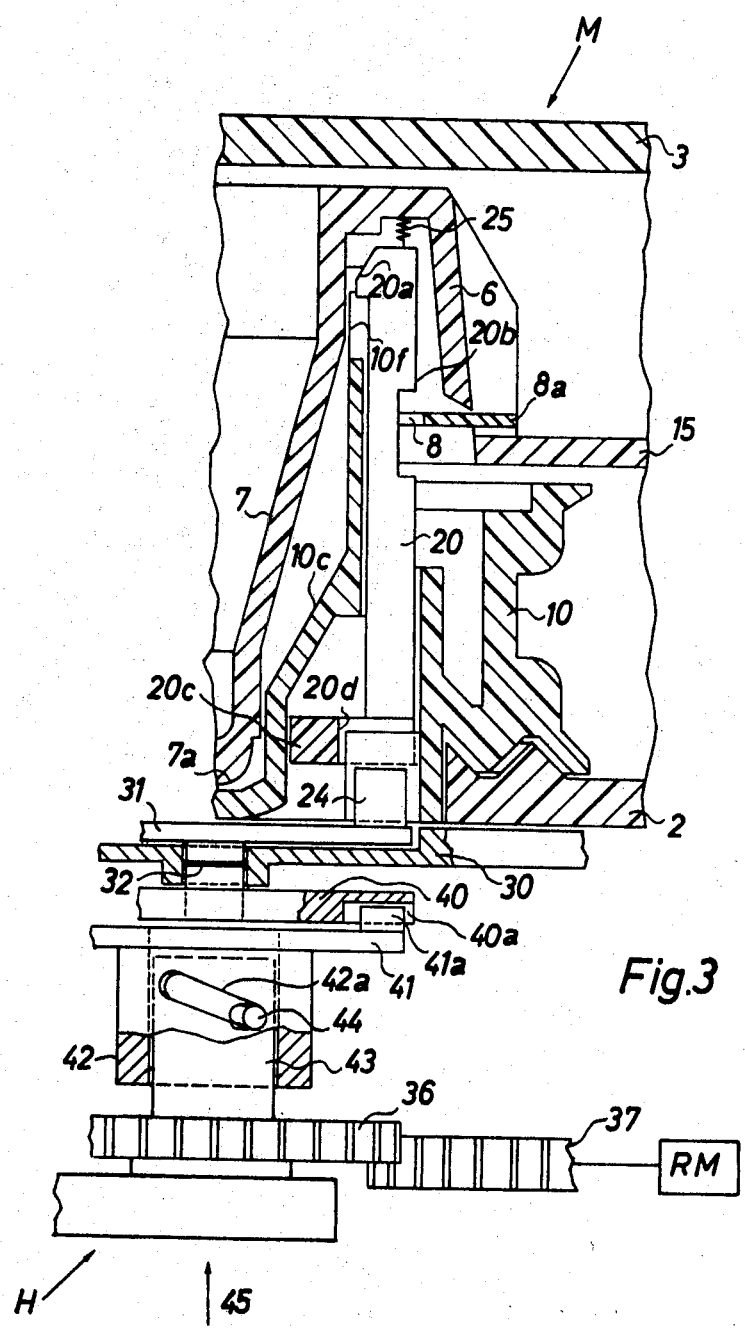
FIG. 3 is a fragmentary sectional view of a second motion-picture camera which can utilize the magazine of FIGS. 1 and 2.

It is clear that the camera shown in FIG. 1 or 3 is susceptible of many additional modifications without departing from the spirit of our invention. For example, the torque-transmitting clutch including the toothed disks 33, 35 of FIG. 1 or the disks 40, 41 of FIG. 3 can be replaced by other types of one-way clutches which can transmit torque when their driving element rotates in one direction but are ineffective when the driving element rotates in the opposite direction.

Figure 4:
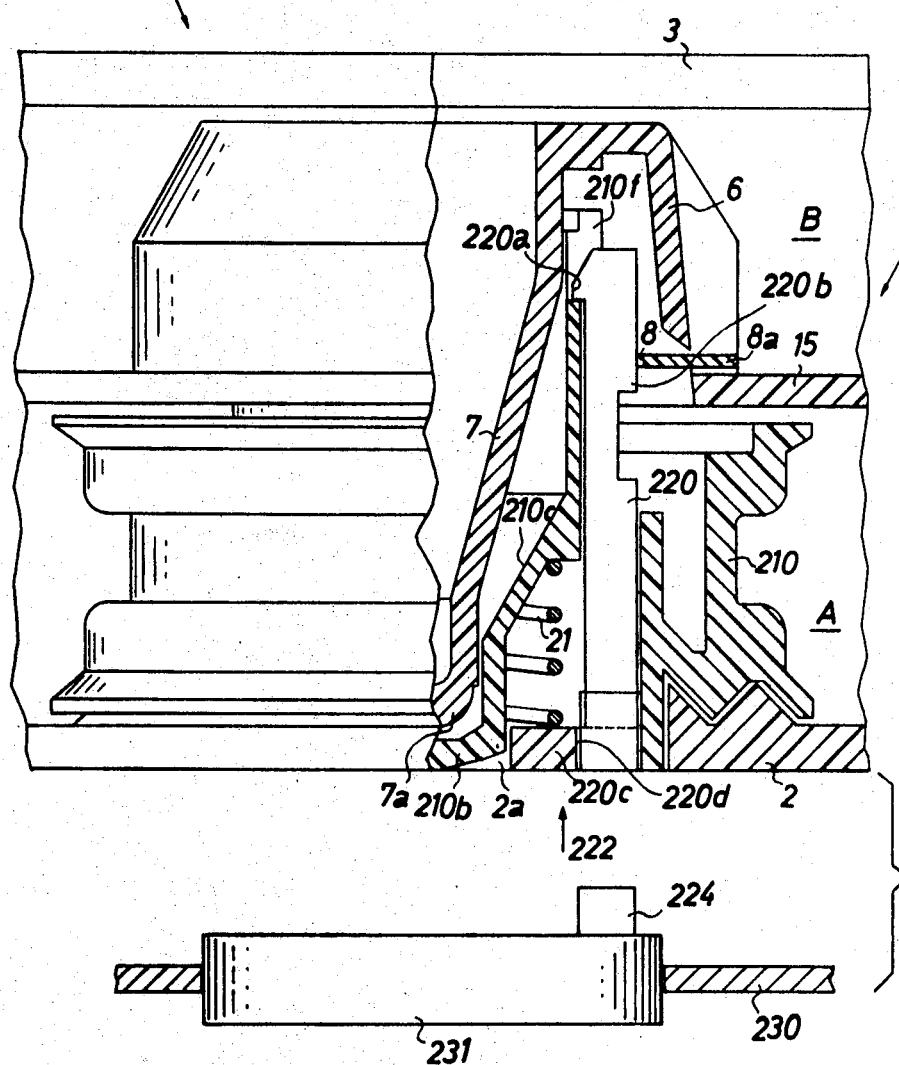
FIG. 4 is a fragmentary axial sectional view of a second magazine, further showing a portion of a motion-picture camera which can be used with the second magazine.

Referring finally to FIG. 4, there is shown a portion of a second magazine or cassette M' which constitutes a slight modification of the magazine M. The casing 1, its covers 2, 3, partition 15 and the fixed core member 6 are constructed and assembled in the same way as described in connection with FIGS. 1 and 2. The difference is that the rotary core member 210 is not provided with torque-receiving portions 10g and that the cylinder or sleeve 220 is biased axially outwardly by a helical spring 21 which reacts against the conical portion 210c and bears against the flange 220c. The flange 220c constitutes a torque-receiving means and has one or more recesses 220d which can receive an elongated output member 224 of a wheel 231 which serves to displace the sleeve 220 axially (arrow 222) so as to move the ribs 220b away from registry with the teeth of the blocking element 8 when the magazine M' is properly inserted into or otherwise attached to the camera. The output member 224 then extends into one of the recesses 220 d and can drive the core member 210 in a clockwise direction by way of the sleeve 220 when the camera is operated in the normal way or during fadeout or fade-in. During rewinding prior to fade-in, the driving connection between the prime mover and the wheel 231 is terminated but the motor drives the claw of the pulldown in a direction to return exposed film from the chamber A into the chamber B. The core member 210 then rotates in a counterclockwise direction under the action of the claw but the friction clutch (not shown in FIG. 4) prevents uncontrolled unwinding of exposed film in the chamber A. The spring 21 expands in response to detachment of the magazine M' from the camera whereby the flange 220c moves into the central opening 2a of the cover 2 and the ribs 220b move into registry with the teeth of the blocking element 8 to thereby prevent unwinding of exposed film during transport of the magazine M' to the developing plant. The numeral 230 denotes a wall forming part of the housing of the motion-picture camera. The numeral 210b denotes the socket of the core member 210 and the numerals 210f, 220a respectively denote the claws on the core member 210 and sleeve 220; these claws insure that the sleeve 220 shares all rotary movements of the core member 210.

It will be seen that the magazine M' can be used in motion-picture cameras having a drive means designed in such a way that its output member 224 can engage and drive the sleeve 220 in the latter's depressed position (when the ribs 220b are away from registry with the teeth of the blocking element 8). Thus, the extent to which the output member 224 projects in the direction indicated by arrow 222 is greater than the extent to which the output member 24 of FIG. 1 extends in the direction of arrow 22.

The magazine M or M' is susceptible of additional modifications. For example, the blocking element or sleeve 20 or 220 can be mounted for rotation with but need not move axially of the core member 10 or 210 if the blocking element 8 is mounted for axial movement in response to attachment of the magazine to a motion-picture camera. Thus, the teeth 8A of the blocking element 8 then move away from registry with the ribs 20b or 220b to produce the same result, namely, to enable the core member 10 or 210 to rotate in either direction when the magazine is properly attached to the camera. In such magazines, the sleeve 20 or 220 can be omitted altogether, and the ribs 20b or 220b can be provided directly on the core member 10 or 210.

Furthermore, the teeth 8A of the blocking element 8 and the ribs 20b or 220b of the sleeve 20 or 220 (or rotary core member 10 or 210) may be replaced with differently configurated and/or dimensioned teeth and ribs, as long as they are capable of cooperating to prevent unwinding of exposed film when the magazine is detached from the camera but permit the core member for exposed film to rotate in two directions when the magazine is attached to the camera. All that counts is to provide a coupling (analogous to the coupling between the blocking element 8 and sleeve 20 or 220) which includes an axially movable component (sleeve 20 in FIG. 1 and sleeve 220 in FIG. 4) which cooperates with the other component to prevent rotation of the core member 10 or 210 in one direction when the axially movable component assumes one axial position and to permit rotation of the core member 10 or 210 in either direction when the axially movable component assumes another axial position, namely, that position which it assumes when the magazine is properly attached to a motion-picture camera.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and therefore such adaptations should and are intended to be comprehended within the meaning and range of equivalence of the claims.

What is claimed as new and desired to be protected by Letters Patent is:

1. In a magazine for motion-picture film wherein unexposed film is stored coaxially with exposed film, a combination comprising a casing defining first and second chambers respectively arranged to accommodate exposed and unexposed film; a core member rotatably accommodated in said first chamber to collect exposed film while rotating in a first direction and to pay out exposed film while rotating in a second direction; and blocking means comprising a first blocking element mounted in said casing and a second blocking element rotatable with said core member, one of said elements being movably substantially axially of said core member between a first position in which said elements cooperate to hold said core member against rotation in said second direction and a second position in which said core member is free to rotate in said second direction.

2. A combination as defined in claim 1, wherein said one blocking element is said second blocking element and wherein said first blocking element has limited freedom of movement substantially radially of said core member.

3. A combination as defined in claim 2, wherein said first blocking element comprises a first number of projections and said second blocking element comprises a second number of projections cooperating with said first-mentioned projections to hold said core member against rotation in said second direction in the first position of said one blocking element.

4. A combination as defined in claim 1, wherein said one blocking element is arranged to move from said first to said second position in response to attachment of the magazine to a motion-picture camera.

5. A combination as defined in claim 1, wherein said blocking elements comprise projections which cooperate to hold the core member against rotation in said second direction in the first position of said one blocking element, the projections of said one element being movable axially of projections of the other blocking element in response to attachment of the magazine to a motion-picture camera whereby the projections of said one element are moved away from registry with the projections of said other element when the one blocking element assumes said second position in response to proper attachment of the magazine to such camera.

6. A combination as defined in claim 1, further comprising biasing means arranged to yieldably urge said one blocking element to said first position thereof.

7. A combination as defined in claim 1, wherein said one blocking element comprises a sleeve which is coupled for rotation with and is movable axially of said core member.

8. A combination as defined in claim 1, wherein said casing includes a portion having an opening and wherein said one blocking element extends into said opening in the first position thereof.

9. A combination as defined in claim 1, wherein said core member is provided with at least one torque-receiving portion which is accessible from without said casing, at least in the second position of said one blocking element.

10. A combination as defined in claim 9, wherein said one blocking element is provided with recess means accommodating said torque-receiving portion in the first position of said one blocking element.

11. A combination as defined in claim 1, wherein said one blocking element comprises torque-receiving means which can be rotated by an output member of a motion-picture camera when said one blocking element assumes said second position and the magazine is properly attached to such camera whereby the output member can rotate said core member by way of said one blocking element.

12. In a motion-picture camera, a combination comprising a housing; a magazine for motion-picture film including a casing defining first and second chambers respectively arranged to accommodate exposed and unexposed film so that the exposed film is stored coaxially with unexposed film, a core member rotatable in said first chamber to collect exposed film while rotating in a first direction and to pay out exposed film while rotating in a second direction, and blocking means comprising a first blocking element mounted in said casing and a second blocking element rotatable with said core member, one of said elements being movably substantially axially of said core member between a first position in which said elements cooperate to hold said core member against rotation in said second direction and a second position in which said core member is free to rotate in said second direction, said casing being movable with reference to said housing between an operative and an inoperative position; and actuating means provided in said housing and operative to move said one blocking element to said second position in response to movement of said casing to said operative position thereof.

13. A combination as defined in claim 12, further comprising drive means installed in said housing and operative to rotate said core member in said first direction in operative position of said casing, said actuating means constituting the output member of said drive means.

14. A combination as defined in claim 13, wherein said drive means further comprises reversible prime mover means and torque-transmitting means interposed between said prime mover means and said output member to rotate said core member in said first direction when said prime mover means is operated in one direction and to permit rotation of said core member in said second direction while said prime mover means is operated in another direction.

15. A combination as defined in claim 14, wherein said torque-transmitting means comprises one-way clutch means.

16. A combination as defined in claim 15, wherein said one-way clutch means comprises a pair of toothed clutch elements.

17. A combination as defined in claim 15, wherein said one-way clutch means comprises a driven clutch element operatively connected with said output member and a driving clutch element arranged to rotate said driven element when said prime mover means is operated in said one direction.

18. A combination as defined in claim 17, wherein one of said clutch elements is movable axially of the other clutch element.

19. A combination as defined in claim 18, wherein one of said clutch elements is provided with at least one cutout and the other clutch element is provided with at least one claw which enters said cutout to rotate said driven element on axial movement of said movable clutch element in response to operation of said prime mover means in said one direction.

20. A combination as defined in claim 14, further comprising friction clutch means interposed between said torque-transmitting means and said output member.

21. A combination as defined in claim 12, wherein said actuating means comprises a member which is rotatable in a clockwise and in a counterclockwise direction.

22. In a motion-picture camera, a combination comprising a housing; a magazine movable with reference to said housing to and from an operative position and including a casing arranged to accommodate coaxial supplies of exposed and unexposed film, a core member rotatable in said casing to collect exposed film while rotating in a first direction, and to pay out exposed film while rotating in a second direction, and a plurality of blocking elements provided in said casing and having blocking portions cooperating to hold the core member against rotation in one of said directions, one of said blocking elements being movable to an idle position in which said core member is free to rotate in either of said directions; and means provided in said housing for moving said one blocking element to said idle position.

* * * * *